Aug. 27, 1968 G. S. DOLGORUKOV 3,398,449
METHOD OF MAKING A T-SQUARE
Original Filed May 15, 1963 3 Sheets-Sheet 1

INVENTOR.
Gregory S. Dolgorukov

Aug. 27, 1968    G. S. DOLGORUKOV    3,398,449
METHOD OF MAKING A T-SQUARE
Original Filed May 15, 1963    3 Sheets-Sheet 2

INVENTOR.
Gregory S. Dolgorukov

3,398,449
METHOD OF MAKING A T-SQUARE
Gregory S. Dolgorukov, Ferndale, Mich.
(407 Fisher Bldg., Detroit, Mich. 48202)
Continuation of abandoned application Ser. No. 288,577, May 15, 1963, which is a continuation-in-part of application Ser. No. 178,868, Mar. 12, 1962, now Patent No. 3,103,071, dated Sept. 10, 1963. This application Oct. 13, 1966, Ser. No. 586,568
7 Claims. (Cl. 29—529)

This invention relates to geometric instruments and more particularly to an improved method of making a T-square adapted for use, particularly but not exclusively, with a drawing board. The present application is a continuation of my copending application Ser. No. 288,577 filed May 15, 1963, now abandoned, which is a continuation-in-part of my applications Ser. No. 178,868 filed Mar. 12, 1962, for T-square, now Patent No. 3,103,071 granted Sept. 10, 1963, and Ser. No. 855,826 filed Nov. 27, 1959, for Drafting Instrument now abandoned.

The conventional T-square construction which has been used with success for many years includes a wooden head and a wooden arm having transparent plastic edges. The head and the arm are usually connected together with the aid of screws. Such screws must necessarily be rather short since the combined thickness of the head and of the arm may be as small as only ½". The plastic edges are usually secured to the wooden arm by a tongue-and-groove construction. In order to provide a more secure connection, a groove is also provided at the free end of the arm and a tie strip made also of plastic is inserted and cemented therein, thus holding in place in a more reliable manner the plastic edges provided at both sides of the wooden arm.

Such a construction, generally, has been very successful. However, in the use of such T-squares some difficulties have been experienced with the joint between the head and the arm. Small screws used for the purposes of such joints usually do not have sufficient bearing area to provide a reliable joint. This condition is aggravated still further by the softness of the wood. As a result, in some T-squares such a joint becomes loose, causing the arm to "rock" or move with respect to the head, making the entire T-square unreliable and virtually unuseable. Accordingly, many proposals of various supplemental screws or joint fastenings seeking to reinforce the joint, or to provide increased bearing area for the connectors have been made, and such joints have been used with various degrees of success.

However, entirely different and much more serious difficulties with T-squares of the above described construction have developed within the last decade. Two particularly objectionable conditions have developed. First, it was observed that the guiding edges of the T-squares made of plastic became less and less durable, showing a number of notches or nicks after a relatively short period of use. It is well appreciated by those skilled in the art that even a single notch on the guiding edge of a T-square or a drafting triangle is very annoying to the user and may force him to discard even a relatively new instrument. Therefore, because of the appearance of such notches, the useful life of triangles and T-squares became objectionably short, greatly increasing the cost of keeping drafting instruments in workable condition, as compared with that of the past years. It was assumed that such notches and nicks are produced by hitting the sharp edges of the instruments on some object. It was found, however, that even extreme care in using the T-square did not substantially decrease this condition and that in some cases such nicks were found even on new instruments. Still more serious was the fact that T-squares made of the best available materials and of well proven construction and apparently with careful workmanship would simply "fall apart" after a relatively short period of use. In schools where T-squares receive somewhat rougher treatment than in professional drafting rooms, breaking or chipping off of the corners of the plastic edges at the free end of the arm and their separation from the wooden arm in many T-squares occurred in some cases as soon as three or four months after the first use, making the T-squares virtually unuseable.

Some attempts have been made to utilize in T-square constructions plastic materials, and particularly acrylic plastic, by making the arm of solid acrylic sheet cut to strips of proper size with the edges and ends of each strip smoothened by milling to provide a fully transparent arm and connecting such arm to a wooden or plastic head with the aid of screws passed through holes drilled in one end of the arm similarly to a wooden arm or an arm made of wood with plastic lined edges. It was found, however, that in addition to loosening of the head such T-square failed very easily by the plastic of the arm cracking through the screw holes. Such cracking resulted in many cases from origination of cracks in the holes because of tightening of the screws, with such cracks extending through the entire width of the blade when further loads were imposed on the arm. While a T-square so failing can be repaired by cutting off the broken end of the arm and redrilling the holes, this fact did not fully solve the problem. In the first place, such repair would have to be done in a shop having a drilling jig with the use of which the original holes were drilled. Such operation obviously cannot be performed by the user in whose hands the T-square was broken and would require return of the T-square to the factory. However, even if repaired at the factory, such T-square would have a shortened arm and would be unuseable on the sizes of drawings for which it was originally intended.

In order to eliminate the necessity of connecting plastic to wood, and for the reasons of less costly production it has been attempted to make T-squares having arms produced from acrylic or styrene plastic by a molding process. Such arms being of one-piece construction did not present the danger of separation of plastic edges and appeared to have produced more durable edges. However, molded plastic arms lacked optically flat surfaces, and, therefore, produced distortion of the image underneath and resulted in eye strain in prolonged use. Moreover, molded guiding edges also lacked the advantages of precision cut edges. However, when attempts were made to straighten edges of molded arms with the use of milling or routing cutters, the above difficulties of nicking and breakage of corners at the free end of the arm were again observed.

Attempts have also been made to produce T-squares having arms of combined wood and plastic construction but to make the plastic part thereof of a unitary construction to prevent separation of the edges. Such arms were made by an extrusion process to provide on their top and bottom surfaces wide but shallow grooves or recesses adapted to receive thin strips of wooden veneer cemented therein. A T-square with such arms looks virtually identical to the conventional wooden T-squares having plastic edges. However, their wavy or "streaky" surfaces and distortion of their transparency was even more objectionable than in the molded T-square arms and their guiding edges, both cut and uncut, proved to have substantially the same disadvantage as molded plastic arms.

I have found that the above difficulties resulted not from the decrease in the quality of workmanship but from the fact that the old conventional construction that stabilized over a period of many years was suitable or advantageous only for the use of materials of that time and particularly for producing T-squares of combined wood and cellulose nitrate plastic construction. Cellulose nitrate plastic is an exceedingly tough and virtually shatter-proof material. Conventional constructions using wooden arms with cellulose plastic transparent edges, except for the matter of loosening of the joint between the head and the arm, served very well and usable T-squares, of such a construction, 20 or 25 years old were not at all uncommon. However, the high inflammability of celluose nitrate plastics requiring extreme precaution in storage and fabrication became more and more realized, causing stricter municipal regulations and higher insurance rates. In addition, the susceptibility of cellulose nitrate to attack by apparently contagious fungus disease greatly increased as time went on.

Such disease usually manifests itself by an unsightly mold or by "sweat" appearing on the surface of drafting instruments, in the case of T-squares on their plastic edges. Within a short time such mold develops into a rather unsightly white growth followed by cracking or crazing of the edges throughout their entire length. The "sweat" appears in the form of a thick liquid precipitate on the surface of the instrument and similarly produces cracks. In addition, presence of sweated cellulose nitrate instruments next to metal drafting instruments, such as drafting compasses, ruling pens, and the like, is very corrosive, and, therefore, damaging to such instruments. As a result, the use of cellulose nitrate for drafting instruments has been virtually discontinued, and other plastic materials, particularly acrylic plastic, have been used for such application for quite a number of years.

I have found that the experienced lack of durability of the conventional T-squares does not result from mechanical causes incidental to their use but is imparted to the edges of T-squares and other drafting instruments in the process of their smoothening with milling or routing cutters. I have also found that separation of the plastic edges from the wooden arm results not from the shortcomings of the cement but is due to the failure of the ends or corners of the plastic edges at the free end of the arm. Such failure occurs even from a very slight impact causing the corners to break off and the tie strip holding the edges to the wooden arm at the end thereof to fall out, whereupon the tongues of the edges come out from the grooves, causing separation of the edges from the arm. I have also found that the difficulties observed in plastic edges of T-squares made by molding or extruding processes but having their edges smoothened by cutting are due to causes similar to those operating in cases of plastic edges or arms made from the best quality cast sheets of acrylic plastic material.

It is an object of the present invention to provide an improved method of making a T-square, for use particularly but not exclusively with a drawing board, whereby the above difficulties and disadvantages are overcome and largely eliminated without introducing other problems or appreciably increasing the costs involved.

Another object of the invention is to provide an improved method of making a T-square having transparent guiding edges made of acrylic resin material and smoothened by removing some of the material, particularly with the use of rotatable cutters or by sanding, means being provided to eliminate the inherent susceptibility of such edges to crumbling out or nicking as well as to chipping along their sharp line edges, even in the normal use of the T-square, and breakage of their corners.

A further object of the present invention is to provide an improved method of making a T-square having its arms made of cast sheet of transparent acrylic resin having optically flat surfaces, providing an arm of undistortable transparency, and having guiding edges smoothened by cutting or sanding, with such edges having greater resistance to crumbling out and to nicking than conventional T-squares having their entire arms, or only their guiding edges, made of acrylic resin and smoothened by cutting.

A still further object of the present invention is to provide an improved method of making a T-square having a head and an arm, said head and arm being secured together by a joint which eliminated any possibility of loosening of the arm or the head, which loosening frequently occurs in conventional T-square and creates a very annoying condition making the T-square virtually unuseable.

A still further object of the present invention is to provide an improved method of making a T-square having a head and an arm connected together by a joint which is strong and durable beyond the possibility of failure under conditions of normal use, including conditions of use that may be expected in schools.

A still further object of the present invention is to provide an improved method of making a T-square having at least its edges made of acrylic resin forming corners at the free end of the arm, which corners, nevertheless, have high resistance to breaking off and to chipping off.

A still further object of the present invention is to provide an improved method of making a T-square in which the use of wood is completely eliminated, thereby eliminating the disadvantages, such as those due to absorption or drying out of moisture, different coefficients of expansion of wood and plastics, separation of plastic from wood at the cemented joints, wearing out of paint or varnish finishes, and the like.

A still further object of the present invention is to provide a method of making a T-square having a head of such configuration as to produce maximum practicable contact area between the contacting surfaces of the arm and of the head and thus to ensure the strongest possible joint produced at said area by the method disclosed herein.

A still further object of the present invention is to provide an improved method of making a T-square made of acrylic plastic, which T-square does not include any extruded or molded plastic parts distorting the image underneath and causing eye strain.

A still further object of the present invention is to provide an improved method of making a T-square fabricated by cutting operations from solid sheets or plates of acrylic resin, and having an improved construction whereby the crumbling out of sharp edges is overcome and largely eliminated in a simple and effective manner, thus producing a stronger and more durable guiding edge.

A still further object of the present invention is to provide an improved method of making a T-square of the character specified in the preceding paragraph, in which guiding edges including sharp line edges causing undercutting and breakage of graphic pencil points are eliminated.

It is an added object of the present invention to provide an improved method of making a T-square of the foregoing character which has only two parts permanently secured together, and which thus is of the simplest possible construction, which is pleasant to handle, convenient to use, and is relatively inexpensive to manufacture.

A still further object of the present invention is to provide an improved method of making a T-square of the foregoing nature in which the tendency of plastic T-squares to breakage of the blade adajcent the T-square head is virtually eliminated, thus producing in view of other numerous advantages of my improved T-square an exceedingly durable instrument capable of withstanding even the roughest usage to which they may be normally subjected, such as that in schools.

A still further object of the present invention is to provide an improved method of making a T-square having a head and a solid plastic arm or blade secured thereto in any suitable manner, such as with the aid of screws or with the aid of an adhesive joint, in which T-square the transition from the rigid head to the flexible arm is made more gradual by stiffening and/or reinforcing the blade at the juncture thereof with the head and thus eliminating the weak spot possessed by such T-square at the place of juncture.

A still further object of the present invention is to provide an improved method of making a T-square having a head and a solid acrylic plastic arm secured thereto, in which T-square excessive flexibility or "whip" in the arm is eliminated in the locality where such "whip" does not present any functional advantage but imposes stresses and strains on the arm which may prove to be beyond its strength.

A still further object of the present invention is to provide an improved method of making a T-square comprising a head and a solid acrylic plastic arm secured thereto, improved means being adapted to resist downward bending of the blade by being put in tension and carrying a substantial portion of the load produced by the force causing such bending, as well as to resist upward bending of the arm by said means operating to stiffen the blade immediately adjacent the T-square head.

A still further object of the present invention is to provide an improved method of making a T-square having a head and a solid acrylic transparent arm or blade, which T-square retains to a certain degree the accustomed appearance of the T-square made of wood and having plastic lined guiding edges, and which, nevertheless, affords all of the advantages of a fully transparent blade and does not have any of the disadvantages of a wooden blade such as covering a material part of the drawing and separating it into two parts, as is the case with conventional opaque wooden arms.

A still further object of the present invention is to provide an improved method of making a T-square made of solid acrylic plastic and including a small piece of wood in the form of a veneer overlay which piece is so selected as to its size and is so disposed within the structure of the T-square as to eliminate the disadvantages caused in conventional T-squares by wood, such as stresses and strains imposed on plastic because of the difference between the coefficients of expansion of the respective materials, with the cumulative effect of such difference in the entire length of the arm causing cracking of the plastic.

A still further object of the invention is to provide an improved method of making a T-square having a head and an arm overlying the head in which the disadvantages of conventional T-squares, such as annoying or pain-producing pressure on the user's left hand is completely eliminated by an expedient enhancing ornamental appearance of the T-square.

A still further object of the invention is to provide an improved method of making a T-square including an arm, the free end of which has corners made of plastic material, which corners are shaped to eliminate the chipping and produceable in a simplified manner.

A still further object of the present invention is to provide an improved method of making a T-square affording opportunities of imparting to the T-square a striking ornamental appearance.

A still further object of the invention is to provide an improved method of making a T-square having a head made of wood, plastic or any other suitable material and an arm or blade made of solid acrylic or similar plastic material and secured to the head with the aid of screws or similar connectors, improved means being provided to eliminate the tendency of the arm of such a T-square to break at the head through the holes provided in the arm for the passage of such connectors.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

While the present invention is illustrated and described with reference to a T-square having an arm made of acrylic plastic, it will be understood that the invention is applicable to other plastic materials having similar physical properties, and particularly flexibility, hardness, and susceptibility to cracking as possessed by acrylic plastics. Accordingly, the term "acrylic plastic" as used in the specification and claims is to be understood as referring to plastic materials of such nature.

Particularly, it shall be understood that in describing the working or guiding edges of T-squares, which edges in my improved T-square include both the guiding surfaces of such edges as well as their surfaces produced by chamfers, I refer to such edges as "guiding edges." On the other hand, the sharp edges, which are produced by two surfaces meeting at an angle and producing such sharp edge, I term "line edges." Thus, the term "line edges" as used herein designates a geometric line at which such surfaces meet. Thus, an unchamfered guiding edge of a conventional T-square has two line edges. On the other hand, the chamfered guiding edge of my improved T-square has four or more line edges.

In accordance with the present invention I eliminate the use of wood as a material for the construction of T-squares. I provide an improved T-square made of solid cast sheets or plates of acrylic resin plastic, with the head and the arm of the T-square being secured together by a non-loosening joint which is strong and durable beyond the possibility of failure in normal use. The construction of the T-square, particularly of the arm thereof, includes edges from which the material at the sharp or line edges thereof having the inevitable minute cracks caused by the milling cutter is removed, producing not only an edge free of such minute cracks showing a tendency to grow but also an edge in which the included angle of its surface is much larger than 90° being approximately 135°. The free end of the arm is constructed in such a manner that breakage of its corners and chipping off of the end edges, inevitable in conventional T-squares having acrylic plastic edges or entire arms, is reduced to a minimum, producing a T-square uncamparably more durable than conventional T-squares.

Figures 1, 3, 3A, 7, 9:
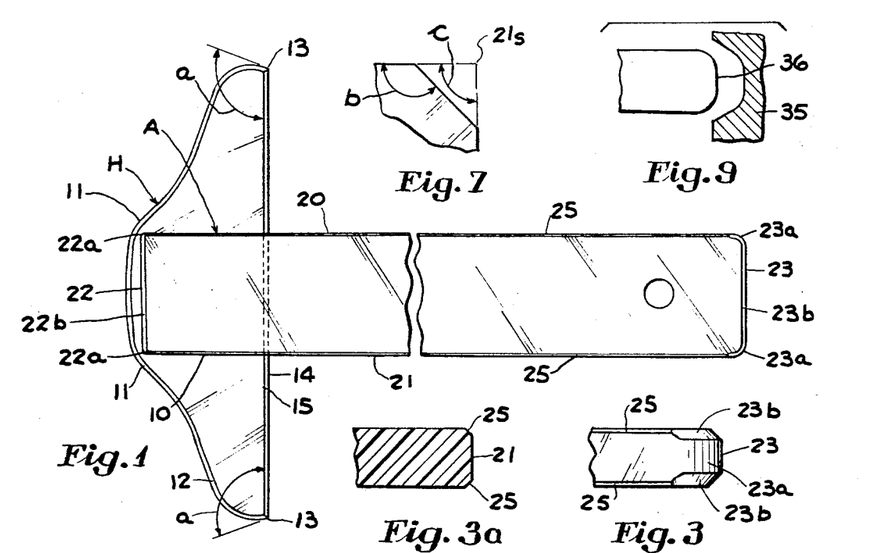
FIG. 1 is a top view showing an improved T-square embodying the present invention.
FIG. 3 is an enlargement of the portion of FIG. 2 encircled within the circle 3.
FIG. 3a is a fragmentary sectional view taken in the direction of the arrows on the section plane passing through the section line 3a—3a of FIG. 2.
FIG. 7 is a fragmentary end view taken in the direction of the arrow 7 on the piece of the material illustrated in FIG. 5.
FIG. 9 is an exploded view showing in section an edge of a still further modified construction.
Figure 2:
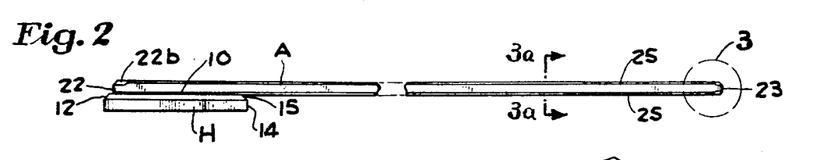
FIG. 2 is an elevational view of the T-square of FIG. 1.

Referring specifically to the drawings, the T-square illustrated therein comprises generally a head H and an arm A secured together as at 10 to provide a unitary construction. The head H is made by profiling from a cast plate of acrylic plastic, preferably of solid black color. The configuration of the head, while resembling that of a conventional T-square head, is more rounded, particularly in places indicated by the numeral 11. Therefore, the head H conforms much better to the configuration of the palm of the user and thus ensures a more convenient hold on the T-square in use. Furthermore, the configuration of the curved edge of the head H is such as to increase the width of the head in the middle thereof, as compared with that of conventional T-squares, and thus to increase the area of the contacting surfaces of the head and of the arm for the purposes explained below. The ends of the head are rounded as indicated at 13, with the tangents to the end curves, at their junctures with the straight guiding edge 14 of the T-square, forming angles $a$ with said edge 14, with the vertices of said angles $a$ being directed toward the arm of the T-square. I prefer to make these angles greater than 90° in order to protect the ends of the head from breaking off or chipping. T-squares having said angles $a$ equal to approximately 110° give very satisfactory results and have a pleasant appearance.

A bevel, such as indicated by the numeral 12, made to a depth of approximately .060", eliminates the sharp corner along the curved edge of the head H at the upper surface thereof, and also contributes to the advantage of a more convenient hold on the head. A bevel similar to the bevel 12 may also be provided along the curved edge of the head H at the lower surface thereof, if desired. The bevel 15, which may be of the same magnitude as the bevel 12, is provided also along the top of the straight edge 14 for the purposes explained further below.

I prefer to make the head H somewhat thinner than wooden heads of corresponding size. For T-squares having arms less than 15" in length, I prefer to use head 6" long and ⅜" to ¼" thick. T-squares having arms 15" to 28" give good results with heads 7½" long and ¼" thick. Heads 9" long and ¼" and even ⅜" thick are sufficiently thick for T-squares having arms between 28" and 30" in length. For T-squares with arms 30" and 36" long, heads 12" long and ⅜" thick give very good results.

The arm A is made of a cast sheet of acrylic resin. Such sheets are made by casting them between two plates of optically flat glass or other material and, therefore, they have correspondingly optically flat surfaces, producing no distortion of the image underneath. On the other hand, molded and extruded plastics do not have such optically flat surfaces ensuring undistorted transparency, and their surfaces, being somewhat wavy and streaky, distort the image underneath and cause eye strain in prolonged use. Arms of ⅛" in thickness give excellent results in lengths from 18" to 36" and 2" to 2½" in width. Arms of less than 18" may be made ⅜₂" or .10" thick and 1½"–1¾" in width.

The guiding edges 20 and 21 of the arm A are smoothened with the aid of rotatable cutters in suitable milling machines to produce smooth and straight edges. The end edges 22 and 23 of the arm A are similarly smoothened, and their corners are rounded on a suitable radius, such as ⅜₁₆", as indicated at 22a and 23a.

Figure 4:
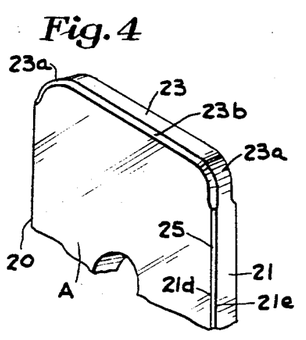
FIG. 4 is a perspective view showing the free end of the arm of the T-square of FIGS. 1–3.

In accordance with the invention, in addition to such rounding of the corners, the end 23 is also beveled preferably at a 45° angle, at both its top and bottom surfaces to the thickness of approximately .040" as is best shown in FIG. 4 at 23b. It is of importance that the bevels 23b extend not only along the edge 23 but also around the corners 23a, and extend, in effect, for a short distance into the longitudinal edges 20 and 21. I have found that merely rounding the corners is wholly insufficient. Corners which are merely rounded even on such a large radius as ¼" chip very badly, and after a period of use look about the same as the broken off square corners. This fact has been accepted in the art as a "necessary evil" unavoidable in use of acrylic plastics. I have found that such chipping results from the fact that in a downward fall a T-square does not fall with its arm strictly perpendicular to the floor, and, therefore, the free end of the arm hits the floor with the arm being somewhat inclined. Therefore, the free end of the arm almost always hits the floor with the sharp edge of the rounded corner. Chipping of the corners under such conditions takes out rather large pieces of plastic, and it is just as objectionable as breaking off of square corners. The bevel 22b may be identical with the bevel 23b, but it is provided only at the upper surface of the T-square and for different purposes. An important purpose served by said bevel 22b is to eliminate shap edges at that end and to produce a more comfortable hand hold on the T-square head.

It is of great importance for the purposes of the present invention that the sharp line edges or corners of the guiding edges 20 and 21 are chamfered for a depth of approximately .020" or more, both at the top and at the bottom of said guiding edges, thus producing a guiding edge shown in FIG. 3a wherein said chamfers are indicated by the numeral 25. Provision of such chamfers, in accordance with the invention, has several exceedingly important advantages. In the first place the angles $b$ formed between the surfaces forming line edges 20a and 20b are increased by virtue of the provision of such chamfers from 90° to 135° producing a guiding edge incomparably stronger and better resistant to nicking from mechanical causes, such as hitting the edge in use on some object. Furthermore, each guiding edge in my improved T-square is, in effect, "dulled." Therefore, it does not undercut the pencil point and does not cause its breakage in drawing long lines as is common with cut acrylic plastic edges of conventional T-squares and other drafting instruments, such as triangles. This particular advantage is disclosed in greater detail in my said copending applications. Chamfering the sharp square line edges of the arm also makes handling of the T-square much more pleasant. It is well known in the art that hand and finger cuts may be caused by sharp edges of cut acrylic plastic edges.

Of particular importance is the function of the provision of such chamfer in removing the material along the line edges of the T-square arm. For the reasons explained before I discarded the conventional understanding that sharp line edges are not objectionable since, presumably, they not only convey more clearly the impression of precision in a new instrument, but lose their sharpness after several months of use. I have found that in cutting plastics of increased hardness and brittleness, such as acrylic plastics, any milling cutter, no matter how sharp, produces separation of the material by, in effect, tearing a portion of it off from the general mass. Such tearing off of the material produces concentrated stresses particularly at the sharp edges of the sheet and origination therein of minute cracks which may extend only as much as .003″ or .004″ inwardly of the plastic sheet. However, such cracks have a tendency to grow and thus to extend further and further into the mass of the material. Should two such cracks occur relatively close to each other and at a large angle, such as 90°, to each other, as indicated at 26 and 27 in FIGS. 5 and 6, they soon meet, whereupon the material between them crumbs out producing a nick. Such nicks are often mistaken for those produced by hitting and, therefore, avoidable by careful use of the instrument. I have found that origination of such nicks is wholly independent of the conditions of use, and that such nicks may occur even in new instruments, particularly those that have been stored for some time.

By providing the chamfer which may be approximately .020″–.030″ in depth, I remove the material including the minute cracks, thus eliminating the above described conditions. It should be appreciated at this point that cutting the chamfer, such as 25, does not produce similar cracks along the lines 20a and 20b. First, the force exerted by the chamfering cutter on the plastic in the process of chamfering is extremely light as compared to a force exerted by the cutter cutting through the entire thickness of the arm strip. Therefore, exertion of such force on the plastic mass does not produce distortion of said mass sufficient to rupture the material. Furthermore, the angles b being greatly increased as compared to the angle c do not cause such high concentration of stresses in the line edges, and whatever concentration may occur thereat is distributed between the two stronger edges and in the mass of material between them. It should be understood that bevels 22b and 23b have a similar effect and advantages, in addition to those disclosed above.

Figures 5, 8:
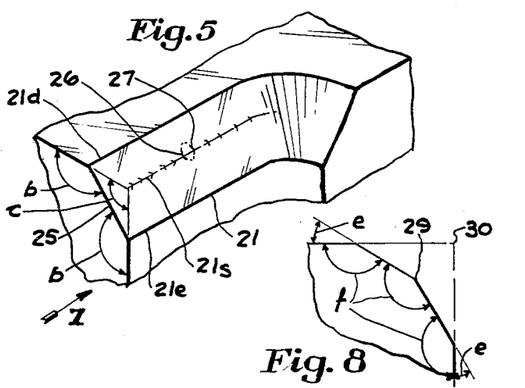
FIG. 5 is a perspective view illustrating the condition of the acrylic plastic material, such as used for the arm of my improved T-squares, after such material has been subjected to the action of a milling cutter for smoothening of its edges.
FIG. 8 is a view similar in part to FIG. 7 but showing an edge having a chamfer of a modified construction.
Figure 6:
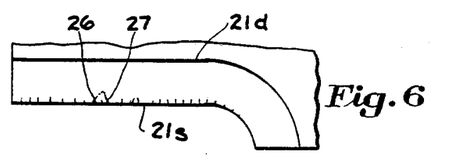
FIG. 6 is a top view of the piece of material illustrated in FIG. 5.

The chamfered edges may also be buffed, thereby producing a glossy surface at said chamfered edges and strengthening them by producing a surface possessing a property known as "surface tension." Although all of the chamfers described above may be provided at 45° angles to the meeting surfaces, it shall be understood that chamfers of other angles may also be used with success. Two chamfers producing a meeting line edge may also be utilized. For example, two chamfers as illustrated in FIG. 8 may be provided at 30° angles e to the surfaces meeting along the line edge 29, whereby all three internal angles f are increased to 150°, producing a still stronger construction. Furthermore, a chamfering cutter producing rounding of the corners rather than providing a straight chamfer may also be used with success. It shall be also understood that if provision of the chamfer is desired both at the top and the bottom surface of the head or the arm, particularly at the ends of the arm and along the curved edge of the head, the same may be produced with the aid of a special cutter illustrated in FIG. 9 and designated therein by the numeral 35, and producing an edge having two rounded corners. Such an edge is illustrated in FIG. 9 and is designated therein by the numeral 36. Similar guiding edges may also be provided on the arm.

In accordance with the invention as illustrated in FIGS. 1–9, for the purposes of securing the arm to the head I discard the use of separate connectors, such as screws, bolts, and the like, although such connectors have been used not only for wooden heads and arms but also for connecting plastic arms to wooden or plastic heads. Use of such connectors, unless combined with the features of construction hereinafter disclosed, has a number of serious disadvantages in all of such applications. I have also found that the place of juncture or contact area between the head and the arm of conventional T-squares may not provide sufficient area to produce a fully reliable joint by other methods. Because of the increased width of my improved head at the middle thereof, such area is sufficiently increased and, therefore, a "cemented" joint provided therein is not only much stronger than that produced with the use of mechanical connectors, but is also much stronger than it could be otherwise, irrespective of the method.

My improved joint is fully non-loosening. This is a very important advantage, since loosening of the joint between the head and the arm may cause the user to operate for considerable length of time, prior to the T-square becoming unuseable, with a T-square in which the arm may move slightly and unnoticeably with respect to the head and produce a mistake in a drawing which may be rather serious, but which, for a considerable length of time, could be attributed to some other cause.

I have also found that the opinion of those skilled in the art to the effect that such a joint is not practical in a T-square and should not be attempted is based on a misconception. Such a misconception may be due to the fact that in cases of molded parts the slight waviness of their mating surfaces causes such a large number of places in the joint where air is entrapped or where no contact occurs in cementing as to produce an unreliable joint. I have also found that this difficulty increases with increasing the area of the joint and may make such a joint prohibitive even in a relatively small area such as presented in a conventional T-square, making further increasing such area objectionable. However, by using an increased area produced by the contact of two optically flat surfaces I produce a superior and unexpectedly strong joint.

I prefer to produce such a joint by using a solvent effective to dissolve and soften the surface of acrylic resin plastic and to produce, in effect, intermingling of the molecules of the two parts. Such an expedient produces a joint approaching in strength that of the virgin mass of the material. Actual experiments with my improved T-square have shown that loosening of such a joint is an impossibility, and that in attempts to separate the parts, either the head or the arm breaks first.

The bevel 15 provided along the straight guiding edge of the head H, and extending in the assembled condition of the T-square both under the arm A and on both sides thereof, performs in my improved T-square three important functions, as described below.

First, it clears any nicks that may be found along the line edge of the guiding edge of a drawing board, as mentioned. Such nicks or raised spots may be produced by separation of splinters of wood at said edge in wooden drawing boards, and by protrusion of the metal at the nicks of metal guiding edges provided in some T-squares.

The second important function of this chamfer is to eliminate the objectionable effect of the small bubbles or tears of plastic produced by the solvent squeezed out from between the contacting plastic surfaces in producing the joint. In some cases the solvent, which has already dissolved some of the plastic material, comes out at the guiding edge of the head under the arm in the form of a rounded tear drop. Such a ball or drop may retain some of its shape and upon solidification of the joint remain as a raised spot under the arm, protruding beyond the guiding surface of the guiding edge. In addition, such a tear drop, which upon dissolving some of the plastic material acquires the properties of a cement, retains in itself a piece of foreign matter which freezes in place. Such a piece or crumb of foreign material forms a protrusion causing rocking of the head on the edge of the drawing board. While such rocking may be hardly noticeable in the head, it is multiplied manifold in the arm, causing rocking of its free end for a considerable distance and thus producing an unreliable T-square. By virtue of the provision of bevel 15, such protrusions are housed within the space of the recess and do not adversely affect precision of the T-square. For this particular purpose of the invention, the bevel 15 should extend at least under the arm and for only a short distance on both sides thereof. It may also be in the form of a square or corner recess. However, I prefer to provide such bevel at a 45° angle and along the entire length of the guiding edge of the head H in order to increase the included angles of its two line edges to 135° and thus greatly improve the strength of the guiding edge. This is the third advantage, and it is of importance.

T-squares of solid acrylic plastic constructed as disclosed above in spite of their much lighter construction proved to be greatly superior to wooden T-squares with acrylic plastic lined edges, both with respect to durability and their convenience in use. Contrary to expectations of those skilled in the art, they withstand rough school use with negligible breakage. By tracing virtually each and every actual case of breakage within the region of predominant use of applicant's equipment, applicant has found that wherever the breakage of his T-square occurred, it was generally due to some extraneous circumstances such as intentional abuse, repeated dropping on cement floors, particularly early in the morning after the T-square had become particularly cold in an unheated room during a cold winter night. By carefully tabulating the cases of such breakage, applicant found that it occurred most frequently in the arm immediately adjacent the head.

The improvements disclosed below are intended to reduce to a minimum the possibility of such breakage first by decreasing the tendency of the arm to bend and thus cause high localized stresses and strains in its outer fibers and particularly in the sharp corners thereof. My co-pending application, Ser. No. 178,868, disclosed an improvement decreasing occurrence of localized stresses when such bending occurs due to various causes, and has proved to be a very valuable expedient. The present application discloses a further improvement whereby the tendency of the arm to bend or occurrence of loads resulting in localization of stresses is reduced, thus reducing the possibility of occurrence of such localized stresses. Accordingly, the improvement disclosed below can be used in combination with the expedients disclosed in my said co-pending application or independently thereof.

Figures 10, 11, 12, 13, 14, 15, 17:
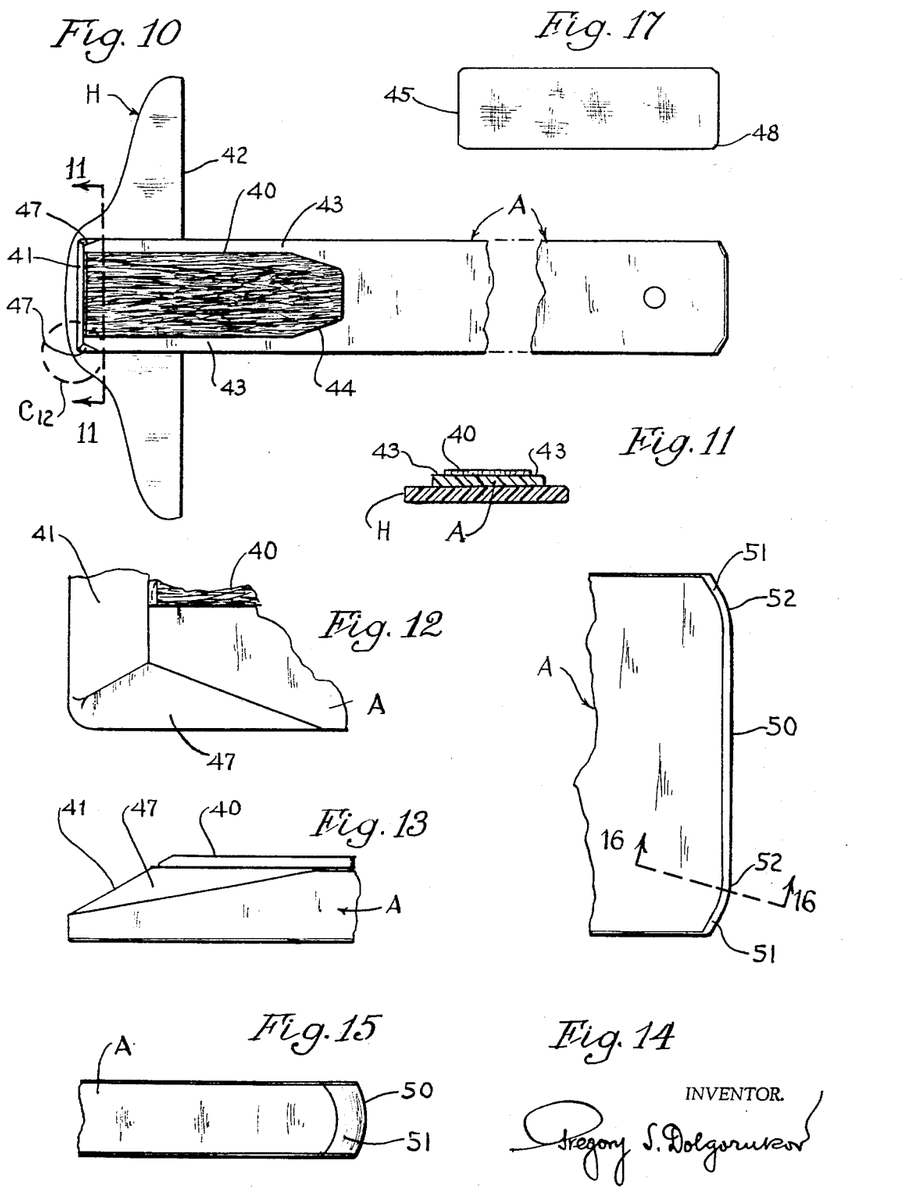
FIG. 10 is a top view similar in part to FIG. 1 and showing a T-square of a modified construction embodying the present invention.
FIG. 11 is a sectional view taken in the direction of the arrows on the section plane passed through the section line 11—11 of FIG. 10.
FIG. 12 is a fragmentary top view showing on an enlarged scale the portion of the fixed end of the T-square arm encircled in FIG. 10 with a circle identified by the numeral $C_{12}$.
FIG. 13 is a side view of the portion of the construction shown in FIG. 12.
FIG. 14 is a view showing on an enlarged scale in FIG. 10 by a circle $C_{14}$ the free end of the arm of the T-square of FIG. 10.
FIG. 15 is a side view of the portion of the construction shown in FIG. 14.
FIG. 17 illustrates a modified form of overlay, namely, an elongated strip of fabric material adapted to be heat bonded to the plastic blade of the T-square.

FIG. 10 illustrates a T-square constructed in accordance with the invention. The T-square illustrated therein comprises a head H and an arm or blade A which, with the exception of additional features described below in detail, may be the same as those in the T-square illustrated in FIGS. 1–9. The joint between the head H and the arm A of the T-square may also be of the same nature to provide a bond through the entire area of contact between the head and the blade, with or without rounding the corners of such bonded area as disclosed in my said co-pending application, Ser. No. 178,868.

In accordance with the invention, at the top surface of the arm A at the fixed end thereof there is provided an overlay generally indicated by the numeral 40 and extending longitudinally of the arm from its beveled edge 41 over the guiding edge 42 of the head and for a substantial distance toward the free end of the arm. The exact length of the overlay 40 depends on the size of the T-square. Generally, it is desirable to provide an overlay extending beyond the guiding edge 42 for approximately the width of the head or somewhat further in order to provide a substantial bonded area between the piece 40 and the arm A. The exact dimensions may be modified for the purpose of giving the overlay piece 40 and, therefore, the entire T-square a pleasing appearance. The width of the piece 40 is smaller than the width of the arm A in order to leave transparent edge portions 43 similar in appearance in that portion of the arm to those of the wooden arms with plastic lined edges. The right hand end of the T-square may be made tapering as indicated at 44. With a T-square having an arm 24″ long and 2¼″ wide, an overlay piece 1¾″ by 5½″ proved to be very satisfactory.

It is of importance that the overlay piece 40 can resist a substantial load in tension. It is desirable, therefore, that the material of the overlay piece have greater resistance in tension than the plastic material of the arm, i.e. has a greater coefficient of elasticity than the material of the arm in order for the piece to assume a substantial portion of the load imposed on the arm by a force tending to bend the arm downwardly. Such overlay may be a piece of strong fabric, a piece of wood veneer, or of another plastic. If wood veneer is used, it is important that the wood grain of the veneer runs longitudinally of the arm to add a further advantage of being resistant to bending of the arm upwardly. The thickness of the wood veneer should be selected in view of its resistance to tension along the grain. I found that wood veneer approximately .040″ thick is very satisfactory.

It is also of importance that connection of the overlay piece 40 with the arm A be substantially throughout the entire area of the contact and be as uniform throughout such area as practicable. Various glues or cements may be used for such purpose. A solvent suitable for the plastic material of the arm may also be used, providing that it does not cause crazing of the plastic. I found that various rubber base cements commonly known as "contact glues," give good results. Where a fabric piece such as the one designated by the numeral 45 in FIG. 17 is used, the same may be treated on its underside with a suitable glue and heat bonded to the blade. The use of ready made strips of such nature intended for repairing clothing and commonly known as "iron-on" patches may also be used.

I prefer the use of wood veneer with the grain running longitudinally of the arm since such veneer affords strong resistance in tension with little stretching and is also sufficiently rigid in the thickness mentioned above to resist upward bending of the arm. It should be appreciated that downward bending of the arm is resisted by putting in tension the overlay piece, be it of wood or fabric, and by putting the bonded area thereof in shear, thus disturbing the tension on the overlay piece throughout the entire area thereof. On the other hand, the upward bending of the arm would tend to put the overlay piece in bending and compression. It is obvious that a fabric piece cannot resist bending and, therefore, such pieces are less advantageous in this particular respect.

Furthermore, wood veneer can be finished in an attractive manner to show wood grain and imparts to the T-square, at least in the vicinity of its head, the accustomed appearance of a wooden T-square having a plastic head and transparent plastic edges but leaving the working portion of the blade fully transparent, thus eliminating the disadvantage of opaqueness of wooden T-squares. Walnut, mahogany, birch, and many other types of veneer are now staple items in the trade and are relatively inexpensive. An overlay of wood veneer stiffens the arm where its bending tends to be the greatest and resists bending of the arm both in the upward direction as well as in the downward direction. It also makes transition from the rigid part of the T-square to the flexible part thereof more gradual. Tapering of the overlay piece at its right hand end makes such transition in the arm itself also more gradual and, therefore, is advantageous from the standpoint of strength.

Considerable problems have been experienced in the past because of the difficulty of holding conventional T-squares at their heads. The corners of the fixed end of the T-square arm pressing on the hand of the user during prolonged use of the T-square cause painful spots requiring holding the T-square head only with the fingers rather than with the entire hand, all in the belief that such an unnatural and inconvenient hold is the solution for such problem. Such belief was caused by the fact that attempts to bevel the end edge of the arm, no matter how heavy, or rounding the corners thereof not only did not prove effective but aggravated the problem. FIGS. 12 and 13 illustrate an improved feature of construction completely eliminating such a difficulty in an exceedingly simple and effective manner. In accordance with the invention the end edge of the arm is first beveled, as indicated at 41 in FIG. 10, whereupon the longitudinal sides of the arm at such corners are beveled with a 30° beveling cutter at an angle between 20° and 30° to the sides of the arm to produce triangular areas 47, as indicated in FIGS. 10, 12 and 13. With such a construction the user can handle the T-square for long periods of time without noticing any inconvenience whatsoever.

FIGS. 10 and 14–16 illustrate a modified construction of the free end of the arm intended to attain the advantages of the construction of FIG. 4. While the construction of FIG. 4 proved exceedingly effective, its production involves a number of complications and may require several operations. The construction shown in FIGS. 10, and 14–16 produces a free end of the arm of three-dimensional curvature to attain the advantages of the construction of FIG. 4, with such configuration susceptible of being produced in a single operation.

Figures 16, 18:
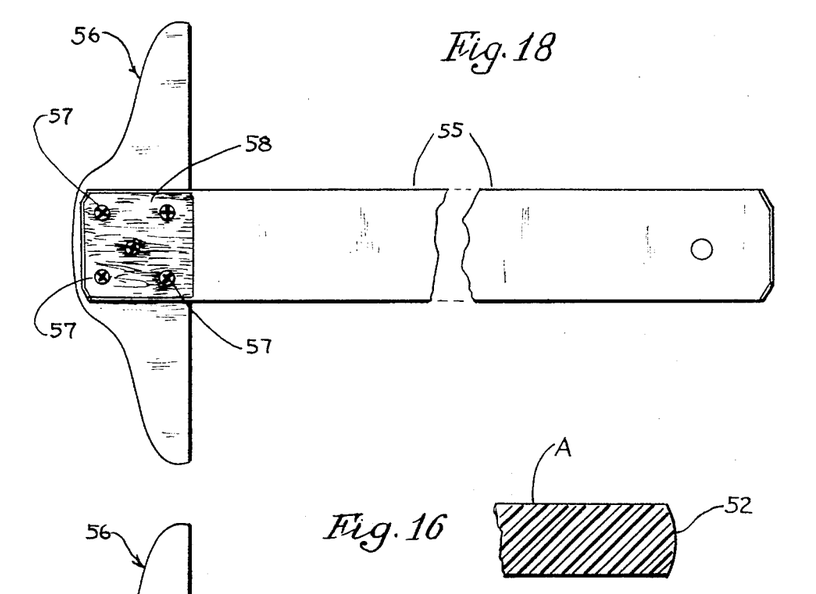
FIG. 16 is a fragmentary sectional view taken in the direction of the arrows on the section plane passed through the section line 16—16 of FIG. 14.
FIG. 18 is a view similar in part to FIG. 10 but showing a T-square including a plastic arm secured to the head with the aid of screws and embodying the present invention.

As can be seen in FIG. 14, the free end of the arm A has configuration including a substantially straight portion 50 and angular portions 51 merging with said edge 50 at well rounded portions 52. As can be seen in FIGS. 15 and 16, such curvilinear configuration is of a rounded cross section throughout its entire length, which may be attained with the use of a cutter such as shown in FIG. 9. A particular advantage of this construction is that it can be produced in one operation, with the arm being guided by a template, and produce proper blending in spite of the fact that due to manufacturing variations arms may vary as much as 1/8″ and even more in their width. With the use of configurations including blending-in arcs, the difference in width of the arms due to manufacturing variations makes proper blending of the corners with the straight portions of the arm very difficult and produces defects such as dips, and the like. The construction of FIG. 15 eliminated such a disadvantage.

It should be appreciated that the fixed end of the arm may also be given a similar configuration. However, instead of a rounded cross section, its cross section should be substantially square at the bottom with heavy bevel at the top.

FIG. 17 illutrates an overlay piece made of substantially unstretchable fabric and having its underside treated with a suitable glue for hot bonding the piece to the T-square to be disposed thereon in a manner similar to the piece 40 of FIG. 10. Such fabric piece can be cut off from rolls of fabric tape commonly sold for the purpose of clothes repairing. Since such fabric pieces do not impart stiffness to the arm, tapering the end thereof as shown at 44 in FIG. 10 is less important, and merely cutting off the sharp corners thereof as illustrated at 48 may be sufficient.

Figure 19:
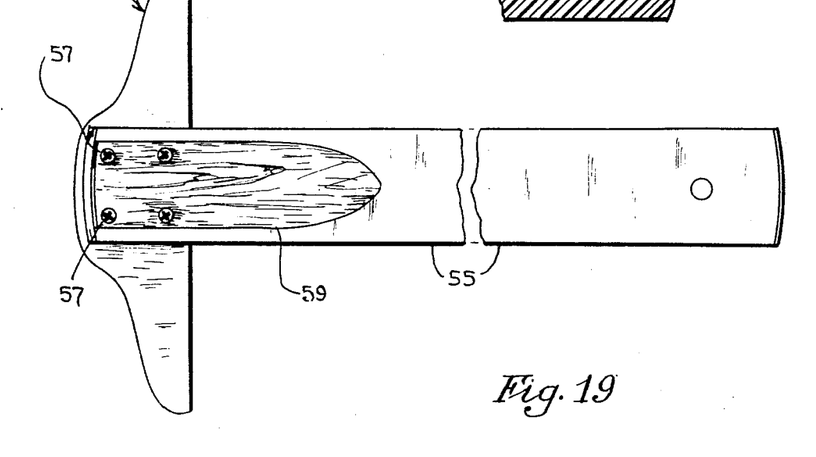
FIG. 19 is a view similar in part to FIG. 18 but showing a still further modification thereof.

FIGS. 18 and 19 illustrate an improved T-square in which a solid or one-piece acrylic plastic arm 55 is connected with the aid of threaded connections, such as screws 57, to the head 56, which head may be of plastic, wood, or other suitable material. As mentioned above, with conventional constructions breakage of such arms through the screw holes made such constructions virtually impractical. In accordance with the invention this difficulty is eliminated by a piece of pliable material of high tensile strength, such as fabric, wood veneer, and the like bonded through its entire area to the head. In FIGS. 18 and 19 such overlay pieces are designated by the numerals 58 and 59, respectively. The piece 58 extends over the joint between the arm 55 and the head 56 through a distance approximately equal to the width of the head. In other words, the overlay piece 58 extends over the fixed end of the arm 55 in its portion overlying the head 56. The width of the piece 58 may be substantially the same as that of the arm 55. It will now be seen in view of the foregoing that tightening of the screws 57 would cause the screw heads to bear not against the surface of the plastic directly producing the danger of cracking the plastic, but over the surface of the overlay piece cushioning and distributing the pressure more uniformly. The fixed end of the arm 55 is also greatly reinforced by the provision of the piece 58 bonded thereto. The piece 59 is similar in its shape to piece 40 of the construction of FIG. 10 and is also bonded to the surface of the arm A throughout substantially the entire area of such piece, with the wood grain running longitudinally of the arm.

It will be understood that with some cements bonding of the overlay piece to the plastic may not produce a continuous or unbroken bond area but a multiplicity of small bonding spots distributed through the area of contact. While the occurrence of "dry spots" between such bonded spots does not decrease the strength of the joint, it, nevertheless, affords attainment in a substantial degree of the advantages disclosed above. However, full advantage of such expedient may be better realized by improving the bond between such surfaces to produce a substantially unbroken bonded area without interruption or dry spots.

It will also be understood that the constructions disclosed herein are exceedingly advantageous for repairing solid acrylic T-squares and particularly T-squares such as illustrated in FIGS. 1–9 should the same break adjacent their heads. To repair such a T-square, the surfaces of the arm at the break are first covered with a suitable cement, glue or solvent and are brought together, with the guiding edges as well as the top and bottom surfaces of the arm being properly aligned. After the joint is dry, such repair may be sufficient by itself. Some broken T-squares have been so repaired and have been used with success for a long time. However, bonding an overlay piece such as 40 or 45 over the break in the manner explained above will greatly reinforce the T-square at the break joint and will bring the strength of the repaired T-square virtually to that of a new T-square. T-squares having one-piece acrylic plastic arms secured to a head with the aid of screws should they break at the arm through the screws holes may be similarly repaired to produce the constructions shown in FIGS. 18 and 19.

In view of the above disclosed construction, the objects of the present invention listed above and numerous additional advantages are attained.

I claim:

1. In a method of making a T-square to attain full transparency of its arm, functional effectiveness and to prevent rapid breakage thereof in use, the steps of providing a cast and annealed sheet of transparent acrylic plastic material, with its surfaces having been cast against polished glass plates to attain optical flatness of said surfaces, sawing an elongated strip of said material, milling the elongated sides and at least one end of said strip to square and smoothen the sides of said strip and thus to provide smooth guiding surfaces, chamfering all sharp line edges formed on said strip by milling for approximately .020″ to remove the material thereof subject to initiations of minutes cracks therein and growing of said cracks inwardly of the arm therefrom, and polishing the chamfered edges to restore the luster and the surface tension therein to prevent origination and growing of minute cracks from the narrow surfaces and from the double edges produced by such chamfering.

2. The method defined in claim 1 and including further steps of connecting the arm so produced to a T-square head, trimming the second end of said strip to bring the same to final length size, eliminating the sharp corners at said end with use of cutter means producing convex end cross section and thus off-setting the top line edges at the end of the arm inwardly of the arm, with such cross section turning toward the head of the T-square at both corners of said end, and polishing said end to restore the luster and the surface tension in the surfaces of said end and thus to prevent origination of minute cracks at the end surfaces and their extension inwardly of the arm on impact.

3. The method defined in claim 2, and including the step of machining the other end of the arm to provide a bevel on the top surface thereof only to the extent of at least half of the thickness of the arm at the end and around the two corners thereof.

4. The method defined in claim 1 and including the further steps of providing a cast and annealed sheet of acrylic plastic material approximately twice as thick as the sheet for making the arm, sawing a piece of said material in the form of a T-square head with machining allowance, profile milling all edges of said head piece to provide a straight guiding surface thereon and to impart to said piece the desired form, relieving all sharp line edges on both sides of said piece to eliminate said edges and to set back the top and bottom line edges of said piece inwardly thereof, polishing all milled and beveled edges to restore the luster and the surface tension thereof, and laminating the beveled edge of the arm and the head piece so produced by solvent joint to produce a unitary structure, with the trimming of free end of the arm being done after completion of the laminating process.

5. In a method of making a T-square to attain full transparency of its arm, functional effectiveness and to prevent rapid breakage thereof in use the steps of providing a cast and annealed sheet of transparent acrylic plastic material, with the surfaces of said sheet having been cast against polished glass plates to attain optical flatness of said surfaces, sawing an elongated strip of said material, milling the elongated sides and at least one end of said strip to square and smoothen the sides of said strip and thus to provide smooth guiding side surfaces, chamfering sharp line edges formed on said strip because of milling for approximately .020" in order to remove the material thereof subject to initiations of minute cracks therein and growing of said cracks inwardly of the arm therefrom, providing a cast and annealed sheet of acrylic plastic material at least twice as thick as the sheet for making the arm, sawing a piece of said material in the form of a T-squre head with machining allowance, profile milling all edges of said headpiece to impart to said piece the desired form and to provide a straight guiding surface thereon, relieving all sharp line edges on both sides of said piece to eliminate said edges, laminating the finished end of the arm and the head by solvent joint to produce a unitary structure, trimming the free end of the arm to bring the length of the arm to its final dimension, with said trimming being done after the step of lamination and with the use of cutter means producing convex end cross section, and cutting off the corners of the free end of the arm with the use of the same cutter means.

6. The method defined in claim 5 and including the additional steps of providing a piece having at least one layer of wood veneer, said piece having thickness smaller than that of the arm, and with its width being narrower than that of the arm, and length equal to approximately two and one-half widths of the head, laminating said piece to the upper surface of the arm to leave the side edges of the arm transparent and with said piece to extend substantially from the laminated end of the arm over the joint of the head with the arm, the guiding surface of the head and the portion of the arm adjacent to said guiding edge.

7. The method defined in claim 6, with the layer of wood veneer of said piece being the upper layer thereof and having a finish bringing out the grain thereof, said grain to run longitudinally of the arm.

References Cited

UNITED STATES PATENTS

| 583,058 | 5/1897 | King | 33—112 |
| 2,315,004 | 3/1943 | Painter | 33—112 |
| 2,562,348 | 7/1951 | Bowser, | 33—107 |
| 2,958,939 | 11/1960 | Turner | 29—407 |
| 3,103,071 | 9/1963 | Dolgorukov | 33—112 |

THOMAS H. EAGER, *Primary Examiner.*